United States Patent [19]
Ownby et al.

[11] Patent Number: 5,162,270
[45] Date of Patent: Nov. 10, 1992

[54] STRUCTURAL CERAMICS INCORPORATING BORON CARBIDE WHISKERS FOR THE STRENGTHENING THEREOF

[75] Inventors: P. Darrell Ownby; Jeng Liu, both of Phelps County, Mo.

[73] Assignee: Third Millennium Technologies, Inc., Knoxville, Tenn.

[21] Appl. No.: 750,490

[22] Filed: Aug. 27, 1991

[51] Int. Cl.$^5$ ............................................. C04B 35/76
[52] U.S. Cl. ........................................ 501/95; 501/91; 501/97; 501/127
[58] Field of Search ...................... 501/95, 91, 97, 127

[56] References Cited

U.S. PATENT DOCUMENTS

| | | | |
|---|---|---|---|
| 3,011,877 | 12/1961 | Schweickert et al. | 422/199 |
| 3,174,827 | 3/1965 | Wakelyn et al. | 423/346 |
| 3,230,053 | 1/1966 | Wakelyn et al. | 422/199 |
| 3,520,740 | 7/1970 | Addamiano | 156/612 |
| 4,174,331 | 11/1979 | Myles | 501/95 |
| 4,370,390 | 1/1983 | Burk | 501/95 |
| 4,387,080 | 6/1983 | Hatta et al. | 501/87 |
| 4,461,842 | 7/1984 | Jamet | 501/95 |
| 4,543,345 | 9/1985 | Wei | 501/95 |
| 4,558,016 | 12/1985 | Bronson et al. | 501/95 |
| 4,585,500 | 4/1986 | Minjolle et al. | 501/95 |
| 4,789,277 | 12/1988 | Rhodes et al. | 501/95 |
| 5,047,186 | 9/1991 | Huckabee et al. | 501/95 |

FOREIGN PATENT DOCUMENTS

| | | | |
|---|---|---|---|
| 60-246268 | 12/1985 | Japan | 501/95 |

*Primary Examiner*—William R. Dixon, Jr.
*Assistant Examiner*—Anthony J. Green
*Attorney, Agent, or Firm*—Pitts & Brittian

[57] ABSTRACT

Ceramic composites, and in particular structural ceramic composites, have enhanced strength, toughness and abrasion resistance due to the presence of up to about 40 volume percent of relatively large boron carbide whiskers. Although whiskers of various sizes were studied, those of particular interest are whiskers having an average diameter greater than about 3 micrometers, and particularly about 5 to about 8 micrometers, with an average aspect ratio of about 50. Due to the larger size, which had been predicted to be detrimental, there is less respiratory health risk when using these whiskers in the manufacturing of thse improved ceramic composites. Since boron carbide whiskers have many properties superior to silicon carbide whiskers, the most common strengthening agent, the findings should lead to several improved ceramic composites.

6 Claims, 1 Drawing Sheet

STRUCTURAL CERAMICS INCORPORATING BORON CARBIDE WHISKERS FOR THE STRENGTHENING THEREOF

DESCRIPTION

1. Technical Field

The present invention relates to ceramic bodies and their formation, and in particular to ceramic bodies that are strengthened by the incorporation of boron carbide whiskers having, for example, a size that minimizes health hazards.

2. Background Art

Oxide and carbide ceramics have many desirable properties which are most useful, and indeed required, for many modern industrial and technological uses and processes. These desirable properties include very high hardness, light weight, abrasion resistance, stability and retention of properties at high temperatures, high strength and chemical durability and inertness. Their characteristic brittleness, however, often limits their use when structural integrity in cyclic load and stress conditions are required.

In recent years there has been increasing interest in the manufacture of composite materials utilizing ceramic whiskers, fibers or platelets as the material used for reinforcing metallic, polymeric or ceramic matrix materials. This not only strengthens most metallic and polymeric matrix materials, but also provides an attractive toughening mechanism for ceramics. Various composites have been described in the patent literature, some of which are U.S. Pat. No. 4,370,390 issued to R. C. Burk on Jan. 25, 1983; U.S. Pat. No. 4,461,842 issued to J. Jamet on Jul. 24, 1984; U.S. Pat. No. 4,543,345 issued to G. C. Wei on Sep. 24, 1985; U.S. Pat. No. 4,558,016 issued to S. O. Bronson, et al, on Dec. 10, 1985; and U.S. Pat. No. 4,585,500 issued to L. Minjolle, et al, on Apr. 29, 1986.

In conjunction with the prior work on reinforced composites, considerable effort regarding the preparation of the reinforcing elements has been described in the patent literature. Typical of such research is reported in U.S. Pat. No. 3,520,740 issued to A. Addamiano on Jul. 14, 1970; U.S. Pat. No. 3,011,877 issued to H. Schwieckert, et al on Dec. 5, 1961; U.S. Pat. No. 4,387,080 issued to Hatta, et al, on Jun. 7, 1983; and U.S. Pat. Nos. 3,174,827 and 3,230,053 issued to N. T. Wakelyn, et al on Mar. 23, 1965 and Jan. 18, 1966, respectively.

It has been the general consensus of ceramists that, when using fibers for strengthening ceramics, the fibers should be relatively small. For example in the above-cited '345 patent to Wei, the silicon carbide fibers are limited to about 0.6 micrometers in diameter and have a length of about 10 to about 80 micrometers. Proposals for using boron carbide whiskers in ceramics have also centered on small-sized whiskers since enhanced strengthening was believed to be achieved using the small whiskers. In fact, reinforcement "models" of larger whiskers in ceramics have indicated that large whiskers will not provide strengthening. As a result, most work has centered around the strengthening of metal matrix materials rather than ceramic materials.

One of the considerations of using whiskers is that of a respiratory health risk, similar to that caused by asbestos, etc. The problem is compounded when small fibers or whiskers are present. For safety, it is generally considered that particles having an equivalent spherical diameter of at least about 3.5 micrometers have a minimum health risk. This corresponds to a whisker having a diameter greater than about 1.5 micrometers. For this reason, the use of whiskers has not been utilized in a wide scale, and particularly not in a ceramic matrix. Further, no boron carbide whiskers are known to have been utilized for reinforcing a ceramic matrix.

Accordingly, it is an object of the present invention to provide a ceramic composite having strengthening achieved by the incorporation of whiskers of a size that reduces respiratory health risk.

It is another object of the present invention to provide a ceramic composite strengthened by boron carbide whiskers of a size that reduces respiratory health risk.

It is a further object of the present invention to provide a structural ceramic having increased toughness and strength, together with improved abrasion resistance, the ceramic having incorporated therein boron carbide whiskers having an average diameter of about 5 to 8 micrometers and an aspect ratio of about 50.

These and other objects of the present invention will become understood by a complete analysis of the description of the invention that follows.

SUMMARY OF THE INVENTION

In accordance with the present invention, structural ceramics such as alumina, silicon nitride and silicon carbide are strengthened by the incorporation therein of boron carbide whiskers of a size that reduces potential respiratory health risk. These whiskers have an average diameter greater than about 3 micrometers, and ideally having a diameter of about 5 to about 8 micrometers, and an aspect ratio of about 50. The boron carbide whiskers are produced by substantially conventional whisker production methods and thoroughly mixed into a selected powdered structural ceramic. This mixture is then fabricated into a desired shape and density using conventional composite forming techniques, with a result that the product composite has high toughness, strength and abrasion resistance.

BEST MODE FOR CARRYING OUT THE INVENTION

Boron carbide whiskers are generally lighter that other ceramic whiskers. They have about the highest hardness, and have a modulus of elasticity and strength about equal to those properties for silicon carbide. However, as discussed above, it has always been considered that only small whiskers would be useful for strengthening ceramics. Accordingly, due to various potential problems, including that of respiratory health risk, little has been done using boron carbide whiskers.

However, now composites of structural ceramics have been investigated using relatively large boron carbide whiskers in accordance with the present invention. One such composite is alumina ($Al_2O_3$) as strengthened with boron carbide whiskers having greater than 3 micrometer diameter, and preferably in a range of 5 to 8 micrometers. These larger whiskers had an aspect ratio (length to diameter) in a range of about 3 to about 200, and generally of about 50. Composites were prepared with a range of volume percent $B_4C$ of up to 20%. Little further advantage was noted above this level up to about 40 volume percent. The alumina powder with which the whiskers were mixed was about 1 micrometer. Intimate mixtures of the constituents were prepared, and samples were hot pressed at about 7500 psi and about 1520 degrees C. to achieve a density of greater than about 98% theoretical. The boron carbide whiskers utilized with the alumina were produced by a process similar to that disclosed in U.S. patent application Ser. No. 07/074,676, now abandoned. The technology thereof is incorporated herein by reference. Of course, other sources of high quality boron carbide whiskers will be of use in the present invention. Several other processes for boron carbide products are disclosed in the aforementioned patent application 07/074,676.

Figure 1:
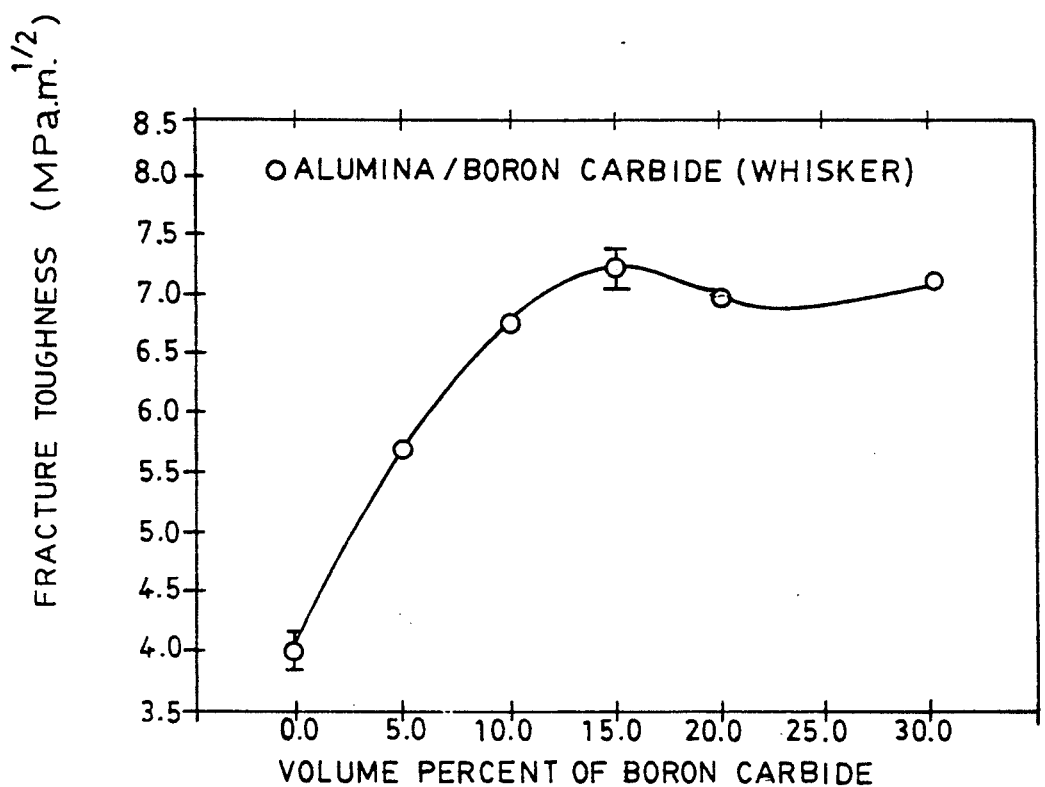
FIG. 1 is a plot of fracture toughness, as a function of volume percent of boron carbide whiskers, for alumina having boron carbide whiskers dispersed therein of a size set forth above.

The composite samples were then subjected to conventional fracture tests which will be known to those versed in the art. The results for the various compositions are plotted in FIG. 1. It can be seen that a significant increase in fracture toughness is achieved with only five volume percent, and a much greater increase is evident at higher whisker concentrations. Little further improvement was noted above about 15 volume percent whisker concentration. Although the plotted data is up to 30 volume percent, other tests have been carried to 40 volume percent which showed the improved characteristic. While fracture of pure alumina ceramics occurs primarily through the individual alumina grains, fracture occurred primarily between grains when the whiskers were present.

Figure 2:
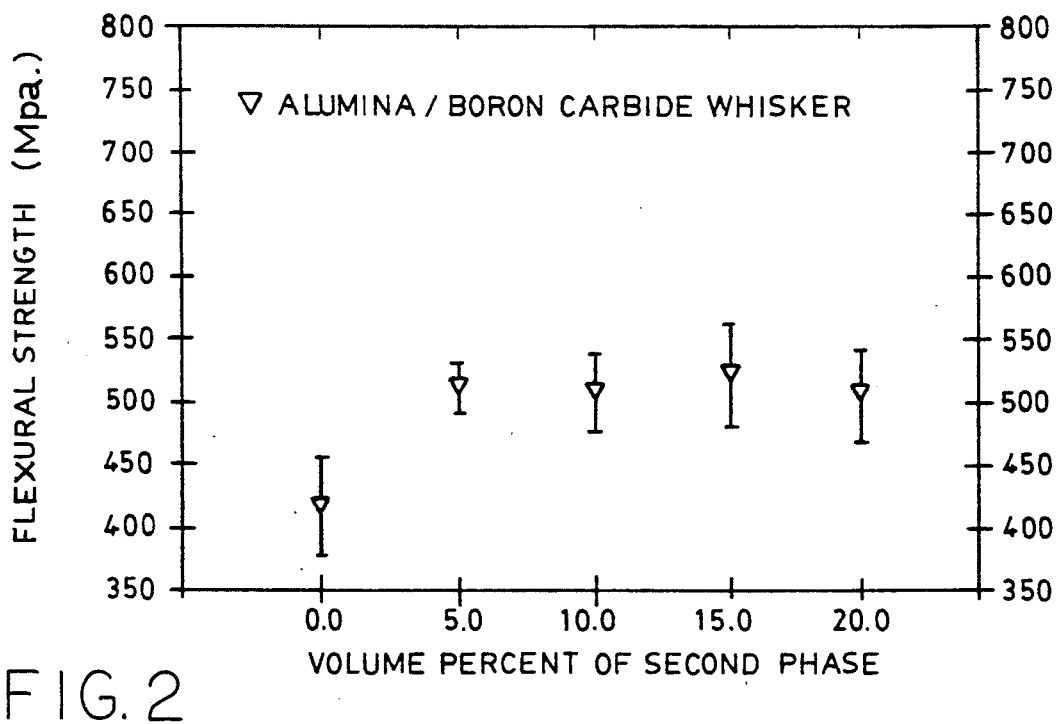
FIG. 2 is a plot of flexural strength of an alumina/boron carbide whisker composite as a function of volume percent of the whiskers used for the data of FIG. 1.

A study of flexural strength of the composites was made. The results are illustrated in the plot of FIG. 2. Essentially all improvement is achieved at a five volume percent boron carbide whisker content, with this improvement maintained up to the twenty volume percent concentration. Tests at up to 40 volume percent have also been conducted with corresponding results. The flexural strength obtained with these compositions compares favorably with other strengthened composites of the prior art using other strengthening agents.

Although limited studies have been conducted, it has been shown that a typical structural ceramic composite can be produced with enhanced properties using large whiskers of boron carbide in contrast to predictions that only small whiskers would function in this role. Accordingly, it is seen that various structural ceramics can be strengthened in this way. These would include alumina (as demonstrated), silicon carbide and silicon nitride. The whiskers, in general, are larger than those that are considered to be a pulmonary health risk. Specifically, the whiskers are larger than about 3 micrometers in diameter, with a preferred range of about 5 to about 8 micrometers. Some tests were even conducted with whiskers having an average diameter of about 1 micrometer to determine the value of boron carbide whiskers in the improvement of ceramic composites. They have a length to provide an aspect ratio average of about 50. Further, the improved properties are achieved with a loading of about one-half the loading required when silicon carbide whiskers are utilized. Although the improvement is particularly important for structural ceramics, the present invention is not limited only to such ceramics but can be applied wherever such improvement is desired in any compatible ceramic.

It will be understood by persons skilled in the art that any specific details of the present invention given herein are for illustration purposes only, and not for a limitation of the invention. Rather, the invention is to be limited only by the appended claims and their equivalents.

We claim:

1. A ceramic composite having improved toughness, strength and abrasion resistance, which comprises a shaped and densified composite of an intimate mixture of a ceramic powder and boron carbide whiskers, said boron carbide whiskers being present from about 1 to about 40 volume percent in said composite, said boron carbide whiskers having an average diameter greater than about 3 micrometers and an average aspect ratio of about 3 to about 200.

2. The composite of claim 1 wherein said ceramic powder has a particle size of about 1 micrometer, and said boron carbide whiskers have an average diameter of about 5 to about 8 micrometers and an average aspect ratio of about 50.

3. The composite of claim 1 wherein said ceramic powder is a structural ceramic selected from the group consisting of alumina, silicon nitride, silicon carbide, and mixtures thereof.

4. A ceramic composite having improved toughness, strength and abrasion resistance, which comprises a shaped and densified composite of an intimate mixture of a ceramic powder and boron carbide whiskers, said ceramic powder having a size of about 1 micrometer, said boron carbide whiskers being present from about 1 to about 40 volume percent in said composite, said boron carbide whiskers having an average diameter of about 5 to about 8 micrometers and an average aspect ratio of about 50.

5. The composite of claim 1 wherein said ceramic powder is a structural ceramic selected from the group consisting of alumina, silicon nitride, silicon carbide, and mixtures thereof.

6. A ceramic composite having improved toughness, strength and abrasion resistance, which comprises a shaped and densified composite of an intimate mixture of a structural ceramic powder and boron carbide whiskers, said structural ceramic powder selected from the group consisting of alumina, silicon nitride, silicon carbide, and mixtures thereof, and having a size of about 1 micrometer, said boron carbide whiskers being present from about 1 to about 40 volume percent in said composite, said boron carbide whiskers having a diameter of about 5 to about 8 micrometers and an average aspect ratio of about 50.

* * * * *